US012228196B2

(12) United States Patent
Steffens et al.

(10) Patent No.: US 12,228,196 B2
(45) Date of Patent: Feb. 18, 2025

(54) ELECTRIC DRIVE SYSTEM

(71) Applicant: Daimler Truck AG, Leinfelden-Echterdingen (DE)

(72) Inventors: Frank Steffens, Ostfildern (DE); Marc Stroelin, Neuhausen (DE); Jens Luckmann, Winnenden (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 173 days.

(21) Appl. No.: 18/043,823

(22) PCT Filed: Aug. 12, 2021

(86) PCT No.: PCT/EP2021/072515
§ 371 (c)(1),
(2) Date: Mar. 2, 2023

(87) PCT Pub. No.: WO2022/048882
PCT Pub. Date: Mar. 10, 2022

(65) Prior Publication Data
US 2024/0026960 A1    Jan. 25, 2024

(30) Foreign Application Priority Data

Sep. 3, 2020 (DE) ...................... 10 2020 005 394.7

(51) Int. Cl.
*F16H 3/093* (2006.01)
*B60K 1/02* (2006.01)
(Continued)

(52) U.S. Cl.
CPC .......... *F16H 37/0806* (2013.01); *B60K 1/02* (2013.01); *B60K 17/08* (2013.01); *B60K 17/165* (2013.01);
(Continued)

(58) Field of Classification Search
CPC ...... F16H 2200/2005; F16H 3/52–3/66; F16H 2200/0043; F16H 2200/2094;
(Continued)

(56) References Cited

U.S. PATENT DOCUMENTS 4,549,443 A * 10/1985 White ..................... F16H 3/085
192/48.607
8,584,543 B2    11/2013 Gitt
(Continued)

FOREIGN PATENT DOCUMENTS

AT          520555 A4    5/2019
CN       104948716 A    9/2015
(Continued)

OTHER PUBLICATIONS

PCT/EP2021/072515, International Search Report dated Jan. 12, 2022 (Two (2) pages).
(Continued)

*Primary Examiner* — Ernesto A Suarez
*Assistant Examiner* — Lillian T Nguyen
(74) *Attorney, Agent, or Firm* — Crowell & Moring LLP

(57) ABSTRACT

An electric drive system has a group transmission with a main group and a range group with a planetary gear set. First and second input shafts of the main group are respectively coupled with first and second electric engines. An output shaft of the main group is coupled with a first element of the planetary gear set and a second element of the planetary gear set is coupled with an output drive shaft of the group transmission. Two idler wheels are disposed coaxially to the first input shaft and two further idler wheels are disposed coaxially to the second input shaft. The first and second input shafts are coupled with the output shaft via two fixed (Continued)

gears. A first fixed gear engages with the first and third idler wheels and a second fixed gear engages with the second and fourth idler wheels.

12 Claims, 1 Drawing Sheet

(51) Int. Cl.
*B60K 17/08* (2006.01)
*B60K 17/16* (2006.01)
*F16H 3/52* (2006.01)
*F16H 37/08* (2006.01)

(52) U.S. Cl.
CPC ............... *F16H 2200/0021* (2013.01); *F16H 2200/0043* (2013.01); *F16H 2200/2005* (2013.01); *F16H 2200/2094* (2013.01)

(58) Field of Classification Search
CPC ......... F16H 3/091–093; F16H 37/0806; F16H 2200/2038–2061; B60K 1/00–02
See application file for complete search history.

(56) References Cited

U.S. PATENT DOCUMENTS

| | | | | |
|---|---|---|---|---|
| 2003/0100395 A1* | 5/2003 | Hiraiwa | ................. | B60K 6/445 |
| | | | | 903/910 |
| 2015/0107408 A1* | 4/2015 | Kaltenbach | .............. | B60K 6/36 |
| | | | | 903/910 |
| 2021/0339619 A1* | 11/2021 | Kaltenbach | .............. | B60K 6/48 |

FOREIGN PATENT DOCUMENTS

| | | |
|---|---|---|
| DE | 10 2005 030 987 A1 | 1/2007 |
| DE | 10 2008 002 380 A1 | 12/2009 |
| DE | 102020005019 A1 * | 2/2022 |
| EP | 2 450 215 A1 | 5/2012 |
| WO | WO 2021/073748 A1 | 4/2021 |

OTHER PUBLICATIONS

German-language German Office Action issued in German application No. 10 2020 005 394.7 dated Apr. 14, 2021 (Five (5) pages).

* cited by examiner

| | S1/S1' | S2/S2' | S3 | S4 |
|---|---|---|---|---|
| 1 | x | | x | |
| 2 | | x | x | |
| 3 | x | | | x |
| 4 | | x | | x |

ELECTRIC DRIVE SYSTEM

BACKGROUND AND SUMMARY OF THE INVENTION

The invention relates to a purely electric drive system, in particular for a motor vehicle of the type defined in more detail herein.

In addition to hybrid drive systems, which realize the drive of a vehicle both with an internal combustion engine and with electric engines, purely electric drive systems are also becoming increasingly important. These systems can comprise a drive system for a purely electrically driven axle having a transmission ratio that can be switched via a transmission, in particular having several gears. The present application is based on DE 10 2008 002 380 A1 as prior art. The latter application shows some of the features of the preamble of the here valid claim, but, unlike in the present invention, in a hybrid system, and not in a purely electric drive system. The structure provides a group transmission having a main group and a range group that has a planetary gear set. Two electrical engines are provided that respectively drive their own input shaft of the main group, while an internal combustion engine can drive the output shaft of the main group via a switchable clutch. This output shaft of the main group is connected to the sun of the planetary gear set of the range group, whose planetary carrier is the output drive of the hybrid drive system. A drive system having 2 electrical engines and a transmission with a countershaft design is further known from AT520555A4. Finally, a hybrid transmission having two electric engines, a transmission main group and a transmission range group with a planetary design is known from DE 10 2008 002 380 A1.

The object of the invention consists of creating a purely electric drive system that enables a comfortable and long-lasting operation.

The purely electric drive system according to the invention, similar to the hybrid drive system in the prior art specified in the introduction, uses two electric motors that drive an output drive shaft of the group transmission via a group transmission having a main transmission and a range group comprising a planetary gear set. One or several driven axles of a vehicle, in particular a commercial vehicle, are then driven via these two electric motors, for example. According to the invention, exactly two idler wheels are provided coaxially to the first input shaft of the main group, and also coaxially to the second input shaft of the main group. A total of four discretely switchable gears and, when required, corresponding virtual intermediate gears are thus created via the two electrical engines without the need for a corresponding complexity in relation to further idler wheels, as would be the case for a hybrid drive system, for example.

By using exactly two idler wheels respectively on the two input shafts, and correspondingly exactly two fixed gears for connecting the output shaft of the main group to their input shafts via one of the idler wheels of the input shafts respectively meshing with the first fixed gear of the output shaft and the two further idler wheels of the respective input shaft meshing with the second fixed gear of the output shaft, a structure is created that enables switching under load within the respective position of the range group. This is possible with simple claw switching elements, as provided according to a particularly favorable development of the electric drive system according to the invention. Unlike complex friction switching elements sensitive to wear, it is now possible to switch easily, comfortably and such that wear is optimized via a corresponding switching of the idler wheels on the respective input shaft under load and with a synchronisation by means of the electric engine.

A further advantage is achieved by positioning the electric engines on the two different input shafts, such that virtual intermediate gears are possible, which in particular improve driving performance. This is in particular the case for heavy vehicles, for which reason the preferred, but not exclusive intended use in the field of commercial vehicles is provided.

A further advantage resulting from using the two electric engines is that one of the two electric engines can be shut down in the partial load operation, which for example represents 70% of the total driving share for long-distance commercial vehicle traffic, which overall has an effect on the lifespan and efficiency of these units.

According to the invention, a third fixed gear that permanently meshes with a fourth fixed gear is further arranged coaxially to the output shaft of the main group, the fourth fixed gear being non-rotatably connected in turn to the first element of the planetary gear set. Such a connection of the planetary gear set, and thus of the range group of the group transmission, allows the structure to be realized efficiently and compactly. Furthermore, according to the invention, a gear wheel non-rotatably connected to the output drive shaft meshes with the differential gear, which is in turn non-rotatably connected to a differential cage of the differential transmission.

Furthermore, according to the invention, an axis of rotation of the first input shaft, an axis of rotation of the second input shaft, an axis of rotation of a sun shaft of the planetary gear set and an axis of rotation of the differential gear are all arranged in parallel to one another.

A non-rotating connection in the sense of the invention should be understood as a connection between rotating elements arranged coaxially to one another, which connects these elements in such a way that they revolve at the same angular speed.

As already indicated above, the idler wheels are correspondingly connected to their respective input shafts such that they can be switched, wherein, according to a very advantageous embodiment of the invention, a first and a second switching element for the first and second idler wheel or the third and fourth idler wheel are respectively provided in the region of each of the input shafts, wherein the respective first switching element is equipped to connect the first or third idler wheel to its respective input shaft, and wherein the respective second switching element is equipped to connect the second or fourth idler wheel to its respective input shaft. Four switching elements in total are thus provided in the region of the input shafts, one for each of the idler wheels. The switching elements are designed such that they optionally connect the idler wheel to its input shaft or not, such that the idler wheel revolves freely in relation to the input shaft. This is sufficient to be able to realize four gears in total, wherein these gears can be switched under load within the same position of the range group, and wherein the drive can optionally be obtained via the one, the other or both electric engines.

According to a further very advantageous embodiment of this idea, it is provided that the first and the second switching element of the respective input shaft are combined into one dual switching element having a neutral position and having an actuator. This use of a dual switching element for the first and the second switching element of the respective input shaft ultimately reduces the total number of required elements to two dual switching elements, one per input shaft. Each of these dual switching elements can respectively be controlled via only one actuator, such that complexity is reduced in relation to the actuation mechanism, which is associated overall with reducing complexity of construction and with saving space, construction space and components.

According to a very advantageous development of the electric drive system according to the invention, a brake switching element is provided within the range group for stalling the third element of the planetary gear set. The transmission ratio of the range group can thus be changed. A further very advantageous embodiment further provides that, alternatively or in particular in addition hereto, a blocking switching element is provided for blocking the first and the third element of the planetary gear set.

According to an exceptionally favorable development, in which the blocking switching element and the brake switching element are both present, these two elements can also be re-combined into a dual switching element having an actuator, such that here too, complexity is correspondingly reduced in relation to each of the input shafts, comparably with the above.

As already mentioned above, the rotors of the two electric engines can be coupled or are able to be coupled with the respective input shaft of the main group. According to an exceptionally favorable development of the electric drive system according to the invention, the rotor of the first electric engine is non-rotatably connected to the first input shaft, and a rotor of the second electric engine is non-rotatably connected to the second input shaft. An additional switching or coupling element between the rotors of the respective electric engines and the input shafts is thus not required, as the input shafts are in any case connected to the idler wheels such that they are able to be switched, and they ultimately also remain uncoupled from the output shaft of the main group of the group transmission in a neutral position of the respective switching elements of the idler wheels, whereby the additional coupling elements can be dispensed with, such that costs, construction space and weight can be saved.

Within the range group, it can be provided according to an exceptionally favorable development of the electric drive system according to the invention that a sun gear of the planetary gear set is designed as the first element, a planetary carrier is designed as the second element and a ring gear is designed as the third element of the planetary gear set. In this case, the connection of the range group to the input shaft thus occurs via a connection of the sun, of the output drive via the planetary carrier, while the ring gear can be stalled according to the advantageous embodiment described above via the brake switching element and/or can be directly, non-rotatably connected to the sun via the blocking switching element.

The first and the second switching element on the respective input shaft can be designed as form-fit switching elements, in particular as claw switching elements, as has already been mentioned above. These switching elements have the significant advantage that they work largely without wear. They can also be switched under load due to the specific constellation of the group transmission according to the invention, wherein the performance loss that may occur can be entirely or at least partially balanced by boosting with the respective other electric engine, and this engine can thus take over the synchronisation in order to enable highly comfortable switching despite the form-fit switching elements.

Further advantageous embodiments of the electric drive system according to the invention also result from the exemplary embodiment, which is described in more detail in the following with reference to the figures.

DETAILED DESCRIPTION OF THE DRAWINGS

Figures 1, 2:
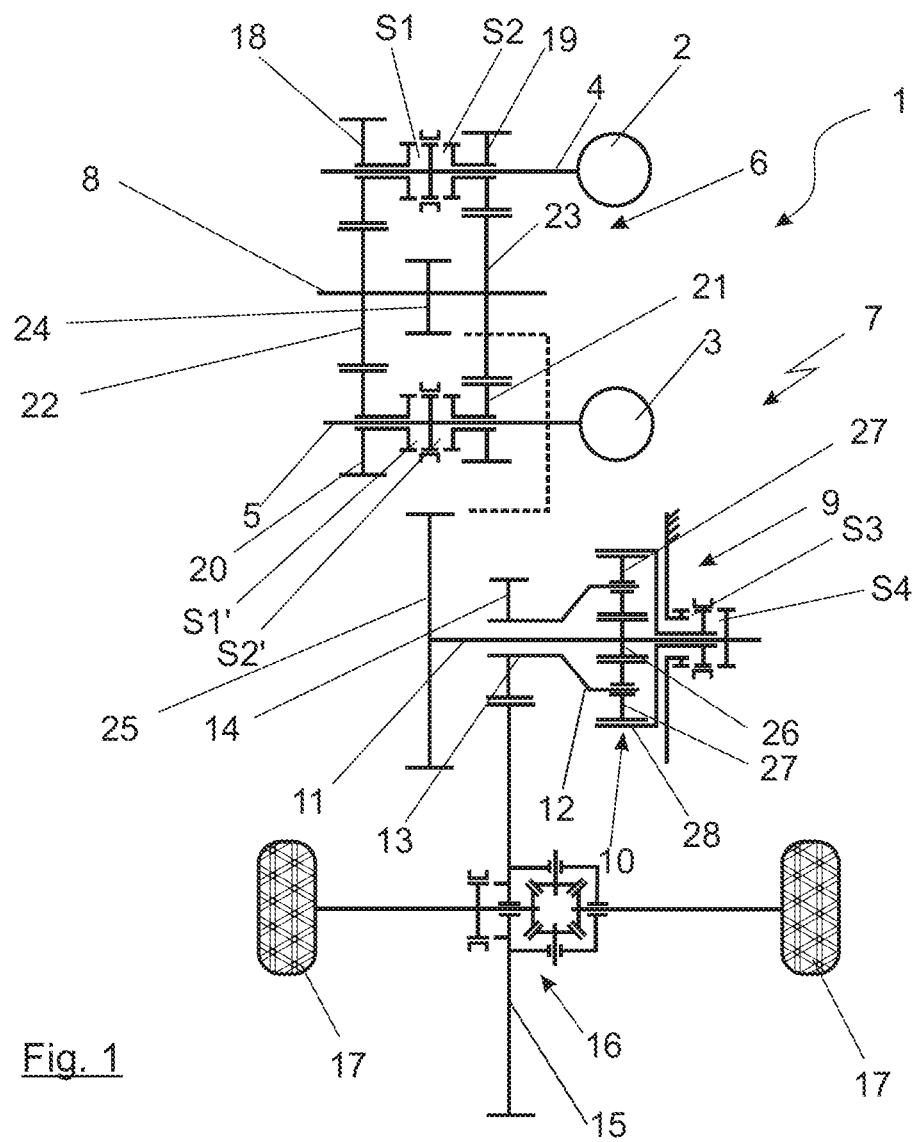
FIG. 1 shows a schematic wheel set plan of a possible structure of an electric drive system according to the invention.
FIG. 2 shows a switch table describing the position of the switching elements in four gears.

In the depiction of FIG. 1, an electric drive system labelled 1 as a whole can be seen. This electric drive system has a first electric engine 2 and a second electric engine 3. A rotor of the first electric engine 2 is non-rotatably connected to a first input shaft 4 and a rotor of the second electric engine 3 is non-rotatably connected to a second input shaft 5. The input shafts 4, 5 are part of a main group 6 of a group transmission 7. An output shaft 8 of the main group 6 of the group transmission 7 is coupled with a range group 9 having a planetary gear set 10. The output shaft 8 of the main group 6 is here connected to a sun shaft 11 of the planetary transmission 10 of the range group 9. An output drive shaft 13 of the group transmission 7 is driven via a planetary carrier 12, the output drive shaft meshing with a differential gear 15 via a gear wheel 14, the differential gear being non-rotatably connected in turn to a differential cage of a differential transmission 16. Two driven wheels 17 of an electrically driven axle of a vehicle, in particular a commercial vehicle, indicated in exemplary form, are finally driven via the differential transmission 16. The differential transmission 16 can be attributed to general knowledge of the art, such that no further detail need be given regarding the differential transmission. The differential transmission is depicted here in exemplary form as a differential transmission 16 having a switchable differential lock.

The output drive shaft 14, which is arranged coaxially to the sun shaft 11, is preferably designed as a hollow shaft, and arranged surrounding the sun shaft 11 designed as a full shaft.

With regard to a torque flow starting from the electric engines 2, 3 to the wheels 17, the electric engines 2, 3, the main group 6, the range group 9, the differential gear 15 and the wheels 17 are arranged one after the other in the specified order.

A first idler wheel 18 and a second idler wheel 19 are arranged on the first input shaft 4 of the main group 6. A third idler wheel 20 and a fourth idler wheel 21 are arranged on the second input shaft 5. First switching elements S1 or S1' and second switching elements S2 or S2' are additionally arranged on the respective input shaft 4, 5 such that they can respectively non-rotatably connect the idler wheels 18, 19 or 20, 21 arranged coaxially to the respective input shaft 4, 5 to the respective input shaft 4, 5. The switching elements S1/S2 and S1'/S2' are preferably designed as dual switching elements having a neutral position as depicted here. They are actuated via a single actuator per dual switching element S1/S2.

The first idler wheel 18 and the third idler wheel 20 of the respective input shaft 4, 5 mesh with a first fixed gear 22 on the output shaft. The second idler wheel 19 and the fourth idler wheel 21 mesh with a second fixed gear 23 on the output shaft 8. The input shafts 4, 5 and the output shaft 8 are exclusively connected to one another via these two fixed gears 22, 23. Unlike in the wheelset diagram shown here, they are not usually arranged in a plane. A third fixed gear 24 can thus be placed axially between the two fixed gears 22, 23, the third fixed gear meshing with a fourth fixed gear 25 on the sun shaft 11 of the planetary gear set 10, and thus driving a sun 26 of the planetary gear set 10 when the output shaft 8 of the main group 6 of the group transmission 7 is driven. The fourth fixed gear 25 is permanently non-rotatably connected to the sun 26 of the planetary gear set 10. The planetary gear set 10 used as a range group 9 is thus driven by the output shaft 8 of the main group 6 via the third gear wheel 24 and the fourth gear wheel 25. In the depiction of the wheelset plan, the fact that the third fixed gear 24 permanently meshes with the fourth fixed gear 25 is correspondingly indicated by a dashed line.

The gear wheel 14 is advantageously arranged axially between the fourth fixed gear 25 and the planetary gear set 10.

The fourth fixed gear 25 and either the first switching element S1, S1' or the second switching element S2, S2' are advantageously arranged axially overlapping one another, such that a very compact arrangement results overall.

The term "axial" relates in this case to an axial direction, and the axial direction is meant as the direction of an axis of rotation of the output shaft 8 or of the axis of rotation of the first input shaft 4 or of the axes of rotation of other shafts arranged in parallel hereto.

Planetary gears 27 on the planetary carrier 12 of the planetary gear set 10 correspondingly mesh with the sun 26 and a ring gear 28 as a third element of the planetary gear set 10. The drive thus occurs via the sun 26 as a first element, the output drive via the planetary gears 27 or their planetary carrier 12, which represents the second element of the planetary gear set. The ring gear 28 can be stalled via a brake switching element S3 as required. The ring gear 28 is then non-rotatably connected to the housing of the group transmission 7, for example, and correspondingly does not rotate. This yields a first transmission ratio of the range group 9. It is also possible to connect the sun 26 as a first element of the planetary gear set 10 to the ring gear 28 or to block it via a blocking switching element S4, which can in turn be combined with the brake switching element S3 as a dual switching element. Another transmission ratio thus results between the sun shaft 11 acting as an input shaft in the range group and the planetary gear carrier 12 connected to the output drive shaft 13.

The planetary gear set 10 is advantageously arranged axially overlapping the first electric engine 2 and also axially overlapping the second electric engine 3.

The term "axially overlapping" with regard to two axially overlapping components should be understood to mean that at least one part of the one component and at least one part of the other component are arranged in a same axial region. The same axial region is defined by a same axial coordinate.

The output shaft 8, the sun shaft 11 and an axis of rotation of the differential gear 15 are advantageously substantially arranged in a shared plane. The two input shafts 4, 5 are advantageously arranged in a further plane, wherein the further plane is arranged substantially perpendicularly to the shared plane.

In the depiction of FIG. 2, the four individual switchable gears are indicated in principle using a switching matrix. The respective gear is in the first column, the position of the first switching element S1 or the first switching element S1' on the respective input shaft 4, 5 is in the second column. The second column correspondingly shows the second switching element S2 or the second switching element S2', the third column the state of the third switching element, and thus of the brake switching element S3, and the fourth column the state of the blocking switching element S4. In the first gear, the switching element S1 and/or the switching element S1' are engaged, and the first idler wheel 18 or the third idler wheel 20 are thus connected to the respective input shaft 4 or 5, depending on which of the two electric engines 2, 3 is driving, wherein both can also drive when required. The brake switching element S3 is simultaneously switched, such that the ring gear 28 is thus non-rotatably stalled on the housing of the group transmission 7, for example. It is now possible to change from the first gear into the second gear, even under load, by releasing the switching element S1 or S1' and engaging the switching element S2 or S2' without this switching position changing within the range group 9, wherein this switching process can be synchronized as required via the electric engines 2, 3. It is thus possible to switch between the gears 1, 2 or 3, 4 very comfortably as required, and within the respective position of the range group 9, to make it such that the two gears 1, 2 or 3, 4 dependent thereon can be switched under load. For this purpose, and this is a considerable advantage in relation to the prior art, no friction switching element is necessary, and instead, the switching elements S1 and S2 or S1' and S2' can be designed as form-fit switching elements, in particular as claw switching elements. For the third and fourth gear, this switching diagram repeats again, wherein unlike in gears 1 and 2, the range group 9 is now switched such that the blocking switching element S4 is active, and the brake switching element S3 is correspondingly released.

By positioning the two electric engines 2, 3 on different input shafts 4, 5, and thus ultimately on different gears, virtual intermediate gears can additionally be enabled by both electric engines 2, 3 driving differently on the output shaft 8. The intermediate gears that can thus be obtained can in particular improve the driving performance for heavy vehicles, such as in particular commercial vehicles. In the regular operation, which is very frequently a partial load operation, the operation of one of the two electric engines 2, 3 is then sufficient, such that the respective other electric engine 2, 3 and the parts of the main group 6 of the group transmission 7 connected thereto do not have to be used, such that wear can be reduced, efficiency can be increased and the lifespan of the structure can be lengthened.

The invention claimed is:

1. A purely electric drive system (1), comprising:
   a first electric engine (2);
   a second electric engine (3);
   a differential transmission (16);
   a driven wheel (17); and
   a group transmission (7) having a main group (6) and a range group (9), wherein the range group (9) has a planetary gear set (10), wherein a first input shaft (4) of the main group (6) is coupled with the first electric engine (2) such that torques starting from the first electric engine (2) are introducible into the group transmission (7) via the first input shaft (4), wherein a second input shaft (5) of the main group (6) is coupled with the second electric engine (3) such that torques starting from the second electric engine (3) are introducible into the group transmission (7) via the second input shaft (5), wherein an output shaft (8) of the main group (6) is permanently coupled with a first element (26) of the planetary gear set (10) such that it transfers torque, and wherein a second element (12) of the planetary gear set (10) is permanently coupled with an output drive shaft (13) of the group transmission (7) such that it transfers torque;
   wherein with regard to a torque flow starting from the first electric engine (2) and the second electric engine (3) to the driven wheel (17), the first electric engine (2), the main group (6), the range group (9), a differential gear (15) and the wheel (17) are disposed one after the other in this order claimed;

wherein exactly two idler wheels (18, 19) comprising a first idler wheel (18) and a second idler wheel (19) are disposed coaxially to the first input shaft (4);

wherein exactly two further idler wheels (20, 21) comprising a third idler wheel (20) and a fourth idler wheel (21) are disposed coaxially to the second input shaft (5);

wherein the first input shaft (4) and second input shaft (5) are coupled with the output shaft (8) via exactly two fixed gears (22, 23) disposed coaxially to the output shaft (8), wherein a first fixed gear (22) of the two fixed gears (22, 23) is in permanent meshed engagement with the first idler wheel (18) and the third idler wheel (20), and wherein a second fixed gear (23) of the two fixed gears (22, 23) is in permanent meshed engagement with the second idler wheel (19) and the fourth idler wheel (21);

wherein a third fixed gear (24) is disposed coaxially to the output shaft (8) and permanently meshes with a fourth fixed gear (25) which is non-rotatably connected to the first element (26) of the planetary gear set (10);

wherein a gear wheel (14) non-rotatably connected to the output drive shaft (13) meshes with the differential gear (15) which is non-rotatably connected to a differential cage of the differential transmission (16);

wherein an axis of rotation of the first input shaft (4), an axis of rotation of the second input shaft (5), an axis of rotation of a sun shaft (11) of the planetary gear set (10) and an axis of rotation of the differential gear (15) are all disposed in parallel and axially offset from one another.

2. The purely electric drive system (1) according to claim 1, wherein a first and a second switching element (S1, S1'; S2, S2') for the first and second idler wheel (18, 19) or the third and fourth idler wheel (20, 21) are respectively disposed in a region of each of the first and second input shafts (4, 5), wherein the respective first switching element (S1, S1') is equipped to connect the first idler wheel (18) or the third idler wheel (20) to its respective input shaft (4, 5), and wherein the respective second switching element (S2, S2') is equipped to connect the second idler wheel (19) or the fourth idler wheel (21) to its second respective input shaft (4, 5).

3. The purely electric drive system (1) according to claim 2, wherein the first and second switching element (S1, S1'; S2, S2') of the respective first and second input shafts (4, 5) are combined into a dual switching element having a neutral position and an actuator.

4. The purely electric drive system according to claim 2, wherein the fourth fixed gear (25) is disposed axially overlapping the first switching element (S1, S1') or the second switching element (S2, S2').

5. The purely electric drive system (1) according to claim 2, wherein the switching elements (S1, S1'; S2, S2') assigned to the respective input shafts (4, 5) are respectively configured as claw switching elements.

6. The purely electric drive system (1) according to claim 1, further comprising a brake switching element (S3) for stalling a third element (28) of the planetary gear set (10).

7. The purely electric drive system (1) according to claim 6, further comprising a blocking switching element (S4) for blocking the first and the third elements (26, 28) of the planetary gear set (10).

8. The purely electric drive system (1) according to claim 7, wherein the brake switching element (S3) and the blocking switching element (S4) are combined into a dual switching element having an actuator.

9. The purely electric drive system (1) according to claim 1, wherein a rotor of the first electric engine (2) is non-rotatably connected to the first input shaft (4) and a rotor of the second electric engine (3) is non-rotatably connected to the second input shaft (5).

10. The purely electric drive system (1) according to claim 1, wherein in the planetary gear set (10), a sun (26) is the first element, a planetary carrier (12) is the second element and a ring gear (28) is a third element.

11. The purely electric drive system (1) according to claim 1, wherein the planetary gear set (10) is disposed axially overlapping the first electric engine (2) and axially overlapping the second electric engine (3).

12. The purely electric drive system (1) according to claim 1, wherein the drive shaft (13) is a hollow shaft and is disposed coaxially to and surrounding the sun shaft (11).

* * * * *